United States Patent
Kawashima

(10) Patent No.: US 8,964,194 B2
(45) Date of Patent: Feb. 24, 2015

(54) IMAGE PROCESSING APPARATUS

(75) Inventor: Tsuyoshi Kawashima, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 224 days.

(21) Appl. No.: 13/614,746

(22) Filed: Sep. 13, 2012

(65) Prior Publication Data
US 2013/0070275 A1 Mar. 21, 2013

(30) Foreign Application Priority Data
Sep. 21, 2011 (JP) ................. 2011-205559

(51) Int. Cl.
G06K 15/02 (2006.01)
H04N 1/00 (2006.01)
H04N 1/32 (2006.01)

(52) U.S. Cl.
CPC ....... H04N 1/00474 (2013.01); H04N 1/00482 (2013.01); H04N 1/00517 (2013.01); H04N 1/32106 (2013.01); H04N 2201/0094 (2013.01); H04N 2201/3274 (2013.01); H04N 2201/3202 (2013.01); H04N 2201/3222 (2013.01)
USPC ......... 358/1.13; 358/1.15; 358/1.1; 358/1.18; 709/203; 709/206; 709/220; 710/100

(58) Field of Classification Search
None
See application file for complete search history.

(56) References Cited

U.S. PATENT DOCUMENTS

| 6,831,752 | B1 * | 12/2004 | Matsuo | 358/1.13 |
|---|---|---|---|---|
| 8,218,184 | B2 * | 7/2012 | Imaoka | 358/1.15 |
| 2001/0024292 | A1 * | 9/2001 | Otake | 358/1.15 |
| 2006/0103875 | A1 * | 5/2006 | Aoki et al. | 358/1.15 |
| 2006/0203256 | A1 * | 9/2006 | Hagiwara | 358/1.1 |
| 2006/0274347 | A1 * | 12/2006 | Mori | 358/1.13 |

FOREIGN PATENT DOCUMENTS

| JP | 2006-031347 A | 2/2006 |
|---|---|---|
| JP | 2008-217569 A | 9/2008 |

* cited by examiner

Primary Examiner — Ashish K Thomas
(74) Attorney, Agent, or Firm — Merchant & Gould PC

(57) ABSTRACT

An image processing apparatus includes: a first storing portion storing first setting groups; and a controller including: a first receiving portion receiving designation of one of the first setting groups; a storage controlling portion storing values of priority and settings of setting items in the first setting group as a second setting group in a second storing portion; a second receiving portion receiving designation of the second setting group stored in the second storing portion; a display controlling portion making a displaying portion display the settings of the setting items in the second setting group; a third receiving portion receiving a change of at least one of the settings of the setting items displayed in the displaying portion; and an execution receiving portion receiving instruction of executing of image processing by using the settings of the setting items displayed in the displaying portion.

10 Claims, 7 Drawing Sheets

FIG.2A  PRESET TABLE 11b

| PRESET NAME | PRESET NUMBER (P) | INITIAL SETTING VALUE OF OPTION (Oi) ||||| INITIAL SETTING VALUE OF DISPLAY PRIORITY (Vi) |||||
|---|---|---|---|---|---|---|---|---|---|---|---|
| | | COLOR (Oi1) | QUALITY (Oi2) | SHEET TYPE (Oi3) | SHEET SIZE (Oi4) | ECO (Oi5) | COLOR (Vi1) | QUALITY (Vi2) | SHEET TYPE (Vi3) | SHEET SIZE (Vi4) | ECO (Vi5) |
| B&W | 1 (P1) | MONOCHROME | NORMAL | REGULAR PAPER | LETTER | OFF | 0.0 | 2.0 | 2.0 | 2.0 | 1.0 |
| Normal | 2 (P2) | COLOR | NORMAL | REGULAR PAPER | LETTER | OFF | 1.0 | 0.0 | 2.0 | 2.0 | 1.0 |
| Eco | 3 (P3) | MONOCHROME | DRAFT | REGULAR PAPER | LETTER | ON | 0.0 | 0.0 | 2.0 | 2.0 | 0.0 |
| ... | ... | ... | ... | ... | ... | ... | ... | ... | ... | ... | ... |

FIG.2B  CUSTOM TABLE 13a

| CUSTOM NAME (NA) | STORAGE AREA INFORMATION (M) | SETTING VALUE OF OPTION (Oc) ||||| SETTING VALUE OF DISPLAY PRIORITY (Vc) |||||
|---|---|---|---|---|---|---|---|---|---|---|---|
| | | COLOR (Oc1) | QUALITY (Oc2) | SHEET TYPE (Oc3) | SHEET SIZE (Oc4) | ECO (Oc5) | COLOR (Vc1) | QUALITY (Vc2) | SHEET TYPE (Vc3) | SHEET SIZE (Vc4) | ECO (Vc5) |
| SAMPLE B&W | 1 | MONOCHROME | NORMAL | REGULAR PAPER | LETTER | OFF | 0.0 | 2.0 | 2.0 | 2.0 | 1.0 |
| My Normal | 2 | COLOR | NORMAL | REGULAR PAPER | L-SIZE | OFF | 1.0 | 0.0 | 2.0 | 2.0 | 1.0 |
| ... | ... | ... | ... | ... | ... | ... | ... | ... | ... | ... | ... |

FIG.2C  OPTION-RANKING-VALUE TABLE 11c

| OPTION | RANKING VALUE (Di) |
|---|---|
| COLOR | 5.0 |
| QUALITY | 4.0 |
| SHEET TYPE | 3.0 |
| SHEET SIZE | 2.0 |
| ECO | 1.0 |

FIG.2D  OPTION FLAG 12g

| VALUE y (OPTION) | FLAG AREA |
|---|---|
| 1 (COLOR) | |
| 2 (QUALITY) | |
| 3 (SHEET TYPE) | |
| 4 (SHEET SIZE) | |
| 5 (ECO) | |

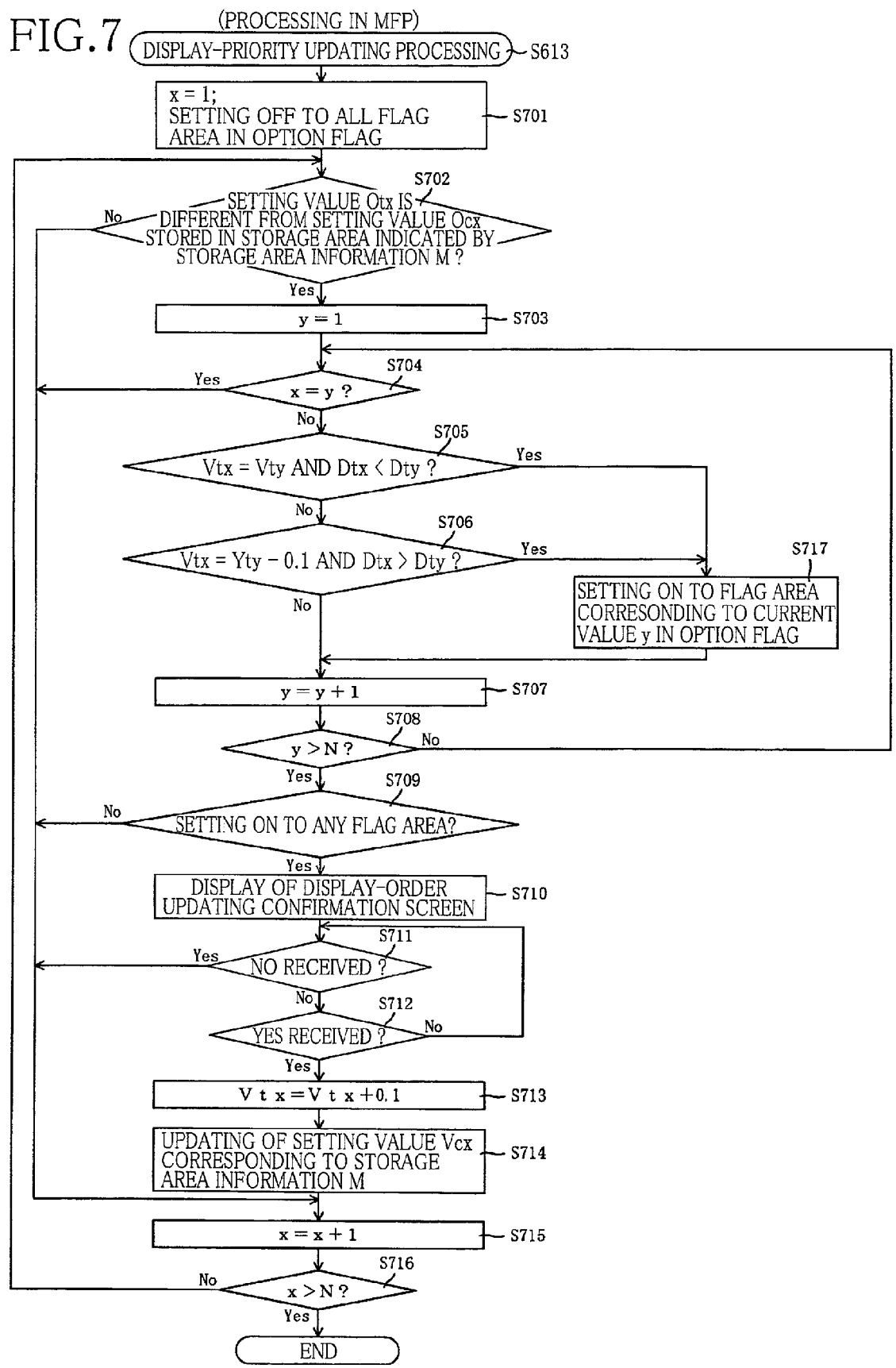

IMAGE PROCESSING APPARATUS

CROSS REFERENCE TO RELAYED APPLICATION

The present application claims priority from Japanese Patent Application No. 2011-205559, which was filed on Sep. 21, 2011, the disclosure of which is herein incorporated by reference to its entirety.

BACKGROUND OF THE INVENTION

1. Field of the Invention

The present invention relates to an image processing apparatus.

2. Discussion of Related Art

A user does not always use setting values of respective setting items regarding various functions including a printing function, which is customized by the user, as they are and sometimes changes the setting values at will when needed. In this situation, in a case where a screen for changing the setting values is relatively small, depending on a display position corresponding to the setting value to be changed, such inconvenience occurs that the user needs to scroll the screen. In order to solve the above-mentioned problem, for example, such a technique can be considered that order in which the setting items are displayed on the screen is changed depending on frequency of change in the setting values.

SUMMARY OF THE INVENTION

However, even in a case where the order of display of the setting items is changed depending on the frequency of change in the setting values, because a default setting value (an initial setting value) of the order of display of the setting items is uniformly determined, at an initial stage after customizing (registering), the setting item whose setting value has a high possibility to be changed may be displayed on a lower part of the screen, so that the above-mentioned problem cannot be solved. Further, in a case where there is little connection between the position of display of the setting item and a possibility of change in the setting value of the setting item, the position of display of the setting item cannot offer information about the possibility of change in the setting value, also leading to inconvenience in a case where the setting value is changed.

It is therefore an object of the present invention to provide an image processing apparatus in which the inconvenience in changing of the setting values is improved or solved.

In order to achieve the above-mentioned object, according to the present invention, there is provided an image recording apparatus configured to be allowed to execute one of an input processing and an output processing of image or image data, comprising: a first storing portion configured to store a plurality of first setting groups each of which includes (a) settings which are respectively predetermined corresponding to a plurality of setting items regarding the image processing and (b) values of priority which are respectively predetermined corresponding to the plurality of setting items; and a controller comprising: a first receiving portion configured to receive a designation of one of the plurality of first setting groups based on an operation of an operating portion; a storage controlling portion configured to store the values of priority respectively corresponding to the plurality of setting items and the settings respectively corresponding to the plurality of setting items, which are included in the first setting group received by the first receiving portion, as a second setting group in a second storing portion; a second receiving portion configured to receive a designation of the second setting group stored in the second storing portion based on the operation of the operating portion; a display controlling portion configured to make a displaying portion display the settings respectively corresponding to the plurality of setting items included in the second setting group received by the second receiving portion, based on positional relations depending on the values of priority respectively corresponding to the plurality of setting items; a third receiving portion configured to receive a change of at least one of the settings respectively corresponding to the plurality of setting items displayed in the displaying portion based on the operation of the operating portion; and an execution receiving portion configured to receive an instruction of executing of the image processing by using the settings respectively corresponding to the plurality of setting items displayed in the displaying portion.

BRIEF DESCRIPTION OF THE DRAWINGS

The above and other objects, features, advantages and technical and industrial significance of the present invention will be better understood by reading the following detailed description of a preferred embodiment of the invention, when considered in connection with the accompanying drawings, in which:

FIGS. 2A through 2D are schematic views respectively showing contents of a preset table, a custom table, an option ranking value table, and an option flag;

FIG. 7 is a flow chart showing a display-priority updating processing.

DETAILED DESCRIPTION OF THE PREFERRED EMBODIMENTS

Figure 1:
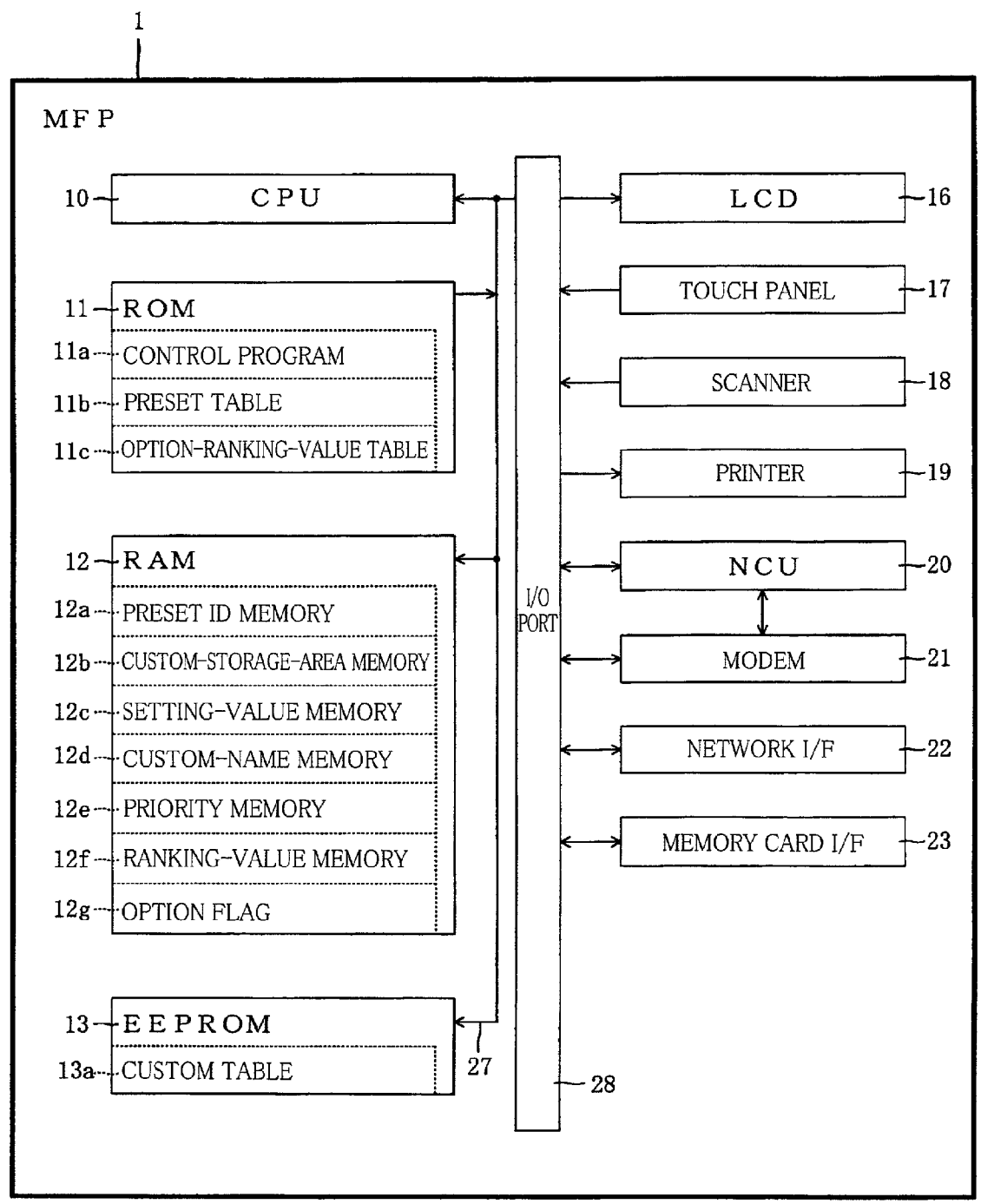
FIG. 1 is a block diagram showing an electrical structure of a Multi Function Peripheral (MFP) as one embodiment of an image processing apparatus to which the present invention is applied.

There will be described embodiments of the invention with reference to the drawings. FIG. 1 is a block diagram showing an electrical structure of a Multi Function Peripheral (MFP) 1 as one embodiment of an image processing apparatus to which the present invention is applied.

The MFP 1 has various functions including a printer function, a copier function, a facsimile machine function, a scanner function, a media print function, and so forth. In the above-mentioned functions, an image processing in which image or image data are inputted or outputted is performed. The MFP 1 in the present embodiment is constructed such that setting values corresponding to options (setting items) regarding the various functions of the MFP 1 are customized and registered from initial setting values (i.e., default setting values) that are designated in advance before shipment. In particular, in the MFP 1 in the present embodiment, the initial setting values respectively include values of priority of display orders of the options (hereinafter referred to as display priority) in a case where the setting values are called up, and it is constructed such that, when customizing (registering), the display priority as an origin (a source) of customizing is set as the display priority after customizing. Accordingly, because the MFP 1 is constructed such that the display priority as the origin of customizing is succeeded as the display priority after customizing, it enhances convenience for a user in a case where the user wants to change the setting values after customizing.

The MFP 1 includes mainly a CPU 10, a ROM 11, a RAM 12, an EEPROM 13, an LCD 16, a touch panel 17, a scanner 18, a printer 19, an NCU 20, a modem 21, a network interface (I/F) 22 and a memory card I/F 23. The CPU 10, the ROM 11, the RAM 12 and the EEPROM are connected to each other via a bus line 27. Further, the LCD 16, the touch panel 17, the scanner 18, the printer 19, the NCU 20, the modem 21, the network I/F 22, the memory card I/F 3 and the bus line 27 are connected to each other via an input/output (I/O) port 28.

The CPU 10 controls the various functions the MFP 1 having and various portions connected to the I/O port 28, according to fixed values and programs that are stored in the ROM 11, data stored in the RAM 12, and various signals transmitted or received via the NCU 20.

The ROM 11 is a non-rewritable memory having a control program 11a, a preset table 11b, an option-ranking-value table 11c and so on. The control program 11a is a program for executing by the CPU 10 of processing described later with reference to FIGS. 5 through 7.

The preset table 11b is a table storing the initial setting values previously designated before shipment with every preset. A term "preset" in the present specification means a group of initial setting values respectively determined corresponding to a plurality of options (setting items) in regard to the various functions of the MFP1. The option-ranking-value table 11c is a table storing values that designate ranks with every option (hereinafter referred to as ranking values). The preset table 11b and the option-ranking-value table 11b will be described later with reference to FIG. 2.

The RAM 12 is a volatile rewritable memory having a temporary area for temporarily storing various data, which is used when the CPU 10 executes the control program 11a. In the temporary area of the RAM 12, there are provided a preset ID memory 12a storing an identification number of the preset selected by the user, a custom-storage-area memory 12b storing storage areas of a custom (described later) selected by the user, a setting-value memory 12c storing respective setting values of the preset or the custom selected by the user, a custom-name memory 12d storing a name of the custom, a priority memory 12e storing the display priority of the options in the preset or the custom selected by the user, a ranking-value memory 12f storing the ranking values of the options in the preset or the custom selected by the user, and an option flag 12g storing an option to be an object for changing of a display order in a display-priority updating processing (shown in FIG. 7) described later. The option flag 12g will be described later with reference to FIG. 2. A term "custom" in the present specification means a group of the setting values obtained by customizing of the plurality of options (setting items) regarding the various functions of the MFP 1.

The EEPROM 13 is a volatile rewritable memory including a custom table 13a. The custom table 13a is a table storing the setting values customized by the user with every custom. The custom table 13 will be described later with reference to FIG. 2.

The LCD 16 is a liquid crystal display. On a screen of the LCD 16, there is formed a touch panel 17. When the user touches the screen of the LCD 16, the touch panel 17 detects the touch and inputs a position of the touch on the screen to the MFP 1. The scanner 18 reads a document and converts the document into image data. The printer 19 prints image on a recording sheet based on the image data. The MCU 20 controls a phone line. The modem 21 modulates transmitting signals when a facsimile transmitting and demodulates modulated signals received when a facsimile receiving. The network I/F 22 is an interface for connecting of the MFP 1 to internet or LAN (local area network) line, not shown. The memory card I/F 23 is an interface to which a memory card (not shown) as a non-volatile memory medium is attached and controls writing or reading of data through the memory card.

As shown in FIG. 2A, the preset table 11b has storage areas 11b1 through 11b4, and in the respective storage areas 11b1 through 11b4, the initial setting values (the default setting values) designated in advance before shipment are stored with every preset.

In the storage area 11b1, there are stored names (preset names) named according to features of the presets. For example, as shown in FIG. 2A, the name "B & W" is stored according to the preset provided for a black and white or a monochrome copy. In addition, the names "Normal" and "Eco" are respectively stored corresponding to the preset for a copy in a normal quality and the preset for a copy in order to reduce the effects on the environment.

In the storage area 11b2, there are stored preset numbers P or identification numbers numbered to the presets. For example, in the storage area 11b2, the preset numbers P1 through P3 are respectively stored corresponding to the preset names "B&W", "Normal" and "Eco".

In the storage area 11b3, the initial setting values Oi of the respective options are stored. In the present embodiment, five options (color, quality, sheet type, sheet size and eco) are provided for all of the presets. Among the five options, the "eco" is an option for printing with converting of a color of image to be printed into a color which requires a smaller amount of ink. The initial setting values of the five options are indicated by the initial setting values Oi1 through Oi5. For example, since the preset "B&W" is, as described before, a preset for the copy in black and white, the "monochrome" is stored as the initial setting value Oi1 of the "color". As the initial setting values Oi2 through Oi5 of the other options in the preset "B&W", "normal", "regular paper", "letter" and "OFF" are respectively stored. On the other hand, since the preset "Normal" is a preset for the copy in normal quality, "normal" is stored as the initial setting value Oi2 of the "quality". As the initial setting values Oi1, Oi3 through Oi5 of the other options in the preset "Normal", "color", "regular paper", "letter" and "OFF" are respectively stored. Further, because the preset "Eco" is provided for the copy in order to reduce the effects on the environment, "monochrome", "draft" and "ON" are respectively stored as the initial setting value Oi1 of the "color", the initial setting value Oi2 of the "quality" and the initial setting value Oi5 of the "eco". As the initial setting values Oi3, Oi4 of the other options in the preset "Eco", "regular paper" and "letter" are respectively stored.

In the storage area 11b4, the initial setting values Vi of the display priority corresponding to the respective options are stored. The initial setting values of the display priority corresponding to the five options (color, quality, sheet type, sheet size and eco) are indicated by the initial setting values Vi1 through Vi5. In the present embodiment, as a value of the display priority is greater, an order of priority of the display order becomes higher, and, as the option has a higher order of priority of the display order, the setting value of the option is displayed at an upper position on the screen.

In the MFP 1 in the present embodiment, the initial setting values Vi (Vi1 through Vi5) of the display priority corresponding to the respective options are designated according to the features of the presets with every preset. For example, in the preset "B&W" for the monochrome copy, the initial setting values Vi2, Vi3, Vi4 of the display priority corresponding to "quality", "sheet type" and "sheet size" are designated as "2.0", the initial setting value Vi5 of the display priority corresponding to "eco" as "1.0", and the initial setting value Vi1 of the display priority corresponding to "color" as "0.0". For example, in the preset "Normal" for the normal-quality copy, the initial setting values Vi3, Vi4 of the display priority corresponding to "sheet type" and "sheet size" are "2.0", the initial setting values Vi1, Vi5 of the display priority corresponding to "color" and "eco" are "1.0", and the initial setting value Vi2 of the display priority corresponding to "quality" is "0.0".

As shown in FIG. 2B, storage areas 13a1 through 13a4 are provided in the custom table 13a, setting values are stored in the respective storage areas 13a1 through 13a4 with every custom.

In the storage area 13a1, names (custom names) named by the user when the customs are registered. For example, as shown in FIG. 2B, the name "Sample B&W" named by the user to the custom formed from the preset "B&W", and the name "My Normal" named by the user to the custom formed from the preset "Normal" are stored.

In the storage area 13a2, information M indicating storage areas of the customs (hereinafter referred to as storage-area information) are stored. In particular, the storage-area information M are numbers indicating that one custom is stored in what line (what order) in the custom table 13a. For example, corresponding to the custom named "My Normal", "2" is stored as the storage-area information M, and this indicates that the custom having the name "My Normal" is stored on the second line (the second from the top) in the custom table 13a.

In the storage area 13a3, the setting values (Oc) of the respective options in each custom are stored. As mentioned before, since any of the presets include five options (color, quality, sheet type, sheet size and eco), any of the customs include these five options. The setting values of the respective options in each custom are respectively indicated by Oc1 through Oc5. For example, the custom "Sample B&W" is a custom made from the preset "B&W" without changing the setting values of the respective options. Therefore, in the custom "Sample B&W", the same values as the initial setting values Oi1 through Oi5 of the respective options in the preset "B&W" are stored as the setting values Oc1 through Oc5 of the respective options. On the other hand, though the custom "My Normal" is a custom made from the preset "Normal", the setting value Oc4 of the option "sheet size" is changed from "letter" to "L-size". Therefore, in the custom "My Normal", "L-size" is stored as the setting value Oc4 of the option "sheet size", and as the setting values Oc1 through Oc3, and Oc5 of the other options, the same values as the setting values Oi1 through Oi3, and Oi5 in the preset "Normal" are stored.

In the storage area 13a4, the setting values Vc of the display priority corresponding to the respective options in each custom are stored. As mentioned before, each custom includes five options included in the presets. The setting values of the display priority corresponding to the respective options in each custom are indicated by Vc1 through Vc5.

The MFP 1 in the present embodiment is constructed such that the initial setting values of the respective options stored as the preset are customized so as to be registered (stored) as the custom. When registering, the initial setting values of the display priority in the preset from which the custom is made are stored as the setting values of the display priority in the custom in question. For example, in a case of the custom "Sample B&W" formed from the preset "B&W", the same values as the initial setting values Vi1 through Vi5 of the display priority in the preset "B&W" are stored as the setting values Vc1 through Vc5 of the display priority in the custom "Sample B&W". Similarly, in a case of the custom "My Normal" made from the preset "Normal", the same values as the initial setting values Vi1 through Vi5 of the display priority in the preset "Normal" are stored as the setting values Vc1 through Vc5 of the display priority in the custom "My Normal". Therefore, in a case where the setting values of the custom right after registering is performed are called up, the display order of the options and the setting values thereof is in accordance with the initial setting values of the display priority in the preset which is the origin of customizing. As mentioned above, in the MFP 1 in the present embodiment, the initial setting values of the display priority corresponding to the respective options are designated with every preset depending on the feature of the preset. Accordingly, the display order of the options and the setting values thereof in the custom at least in the beginning of time right after registering becomes display order depending on the feature of the preset which is the origin of customizing.

For example, since the preset "B&W" is a preset for the monochrome copy, it is less likely that the user changes the setting value of the option "color" from monochrome to color. Therefore, in the preset "B&W", the setting value of the display priority corresponding to the option "color" is designated as the lowest setting value. Because the custom "Sample B&W" succeeds to the initial setting values of the display priority in the preset "B&W", similarly to the preset "B&W", the setting value of the display priority corresponding to the option "color" comes to the lowest value.

Accordingly, in a case where the custom "Sample B&W" at least in the beginning of time right after registering is called up, the option "color" among the five options which has the lowest possibility of changing in the setting values is displayed at the lowermost position on the screen, while the other options which have higher possibility of changing in the setting value are displayed at relatively upper positions on the screen. Therefore, in the MFP 1 in the present embodiment, display positions of the options on the screen and the possibilities of changing in the setting values (changing frequency) can be related with each other, so that the display positions of the options can give to the user information about the possibilities of changing in the setting values. Accordingly, since the user can predict which setting values of the options should be changed based on the display positions of the options on the screen, it increases convenience in a case where the setting values are changed.

As shown in FIG. 2C, in the option-ranking-value table 11c, ranking values Di are stored with every option. The ranking values Di are values for specifying ranking among the options. In a case where the options have the same setting values Vc of the display priority in the custom, the option having a greater ranking value Di is displayed at an upper position on the screen in the display order. As shown in FIG. 2C, in the present embodiment, the ranking values Di corresponding to the respective options are ranked in descending order of the ranking values Di: color>quality>sheet type>sheet size>eco.

As shown in FIG. 2D, the option flag 12g consists of flag areas 12g1 which are disposed with every value of a variable y. The variable y is a value designating the options. In the present embodiment, there are five options, so that the variables y consist of values from 1 to 5. For ease of understanding, in FIG. 2D, the names of options corresponding to the respective values y are shown in parentheses on right sides of the respective values y. In the flag areas 12g1 corresponding to the respective values y, values indicating whether the display order should be changed are set.

Figure 3A:
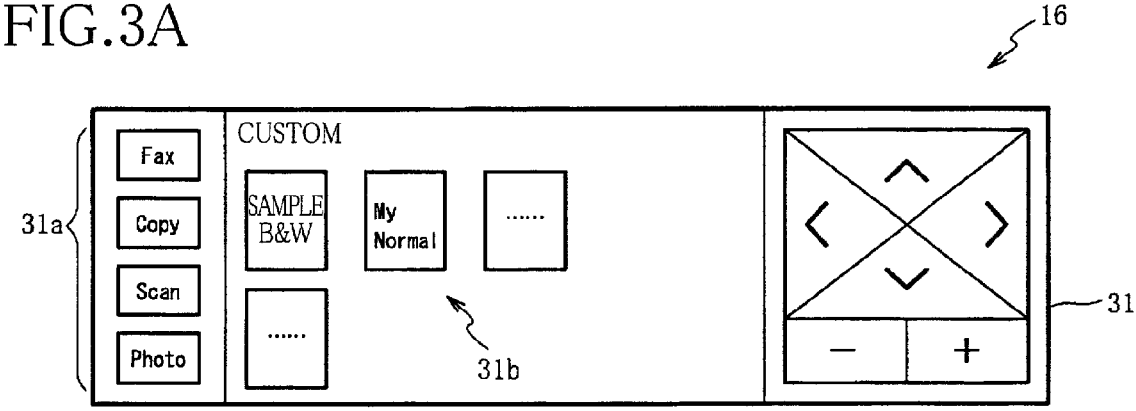
FIGS. 3A through 3C are schematic views respectively showing examples of a standby screen, a preset selection screen and an option setting screen which are displayed on a Liquid. Crystal Display (LCD) in a case where a custom is made from a preset and registered.

Further, in a case where the custom is formed from the preset and registered, transition of the screen displayed on the LCD 16 will be described with reference to FIGS. 3A through 3C. As shown in FIG. 3A, a standby screen (display) 31 is a screen displayed in a case where the MFP 1 is in a standby state (condition). The standby screen 31 includes function selection buttons 31a respectively disposed corresponding to the functions that the MFP 1 can perform, custom buttons 31b respectively disposed corresponding to the registered customs, and so forth. When the user touches (operates) one of the function selection buttons 31a corresponding to a desired function, a function execution screen (not shown) for executing the function corresponding to the touched button (e.g., the copier function) is displayed on the LCD 16. The function execution screen, not shown, includes a preset-selection-screen display button for displaying a preset selection screen 32. When the user touches the preset-selection-screen display button, the preset selection screen 32 is displayed on the LCD 16.

Figure 3B:
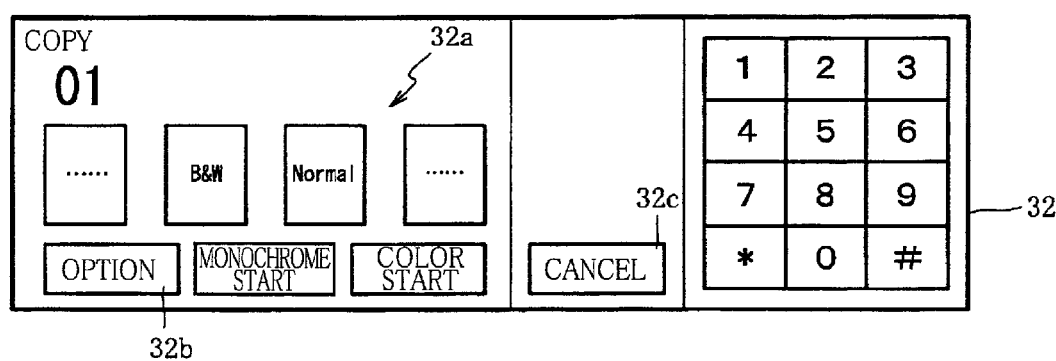

In FIG. 3B, there is exemplified the preset selection screen 32 displayed followed by the function execution screen (not shown) for executing the copier function. The preset selection screen 32 is a screen for the user to select a desired one of the presets provided corresponding to the selected function (the copier function). The preset selection screen 32 includes preset buttons 32a disposed with every preset corresponding to the copier function, a option button 32b for instructing a shift to an option setting screen 33, a cancel button 32c for canceling processing and returning to a previous screen, and so on. When the user touches one of the preset buttons 32a corresponding to the desired preset, the touched button comes into a selected state (an active state). Subsequently, after the preset button 32a is in the selected state, when the user touches the option button 43b, the option setting screen 33 is displayed on the LCD 16.

Figure 3C:
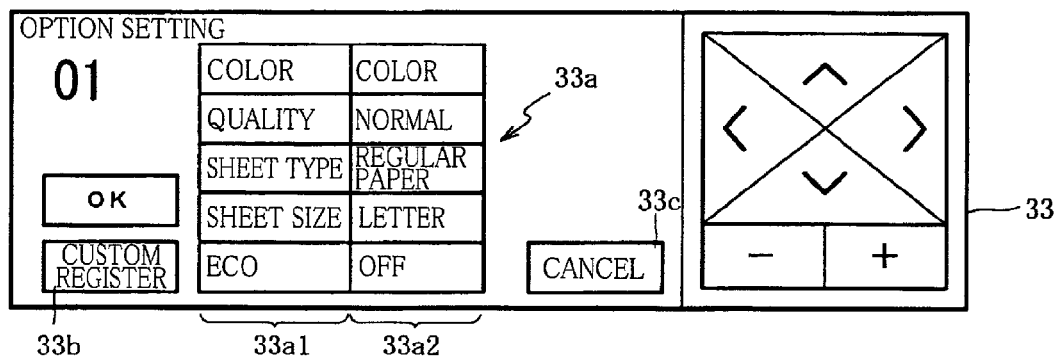

In FIG. 3C, there is exemplified the option setting screen 33 displayed in a case where the user touches the option button 32b after having touched the preset button 32a corresponding to the preset "B&W" in the preset selection screen 32 in FIG. 3B. The option setting screen 33 is a screen for changing the setting values of the options (the setting items) included in the selected preset (the preset corresponding to the preset button 32a which is in the selected state on the preset selection screen 32). The option setting screen 33 includes an option display area 33a, a custom registering button 33b for instructing to register as the custom, a cancel button 33c for canceling a processing and returning to a previous screen, and so on.

The option display area 33a consists of an option display area 33a1 for displaying the names of the options (the names of the setting items) included in the selected preset, and a setting-value display area 33a2 for displaying the setting values of the respective options. When the user touches one of the setting values in the setting-value display area 33a, which the user desires to change, the setting value becomes in a changeable state. In a case where the user touches the custom registering button 33b, the respective options and the setting values thereof displayed in the option display area 33a at the time are stored in the custom table 13a and registered as the custom. Further, in the case where the user touches the custom registering button 33b, the standby screen 31 in FIG. 3A is displayed on the LCD 16. In this case, the custom button 31b corresponding to the registered custom is added to the standby screen 31.

Figure 4A:
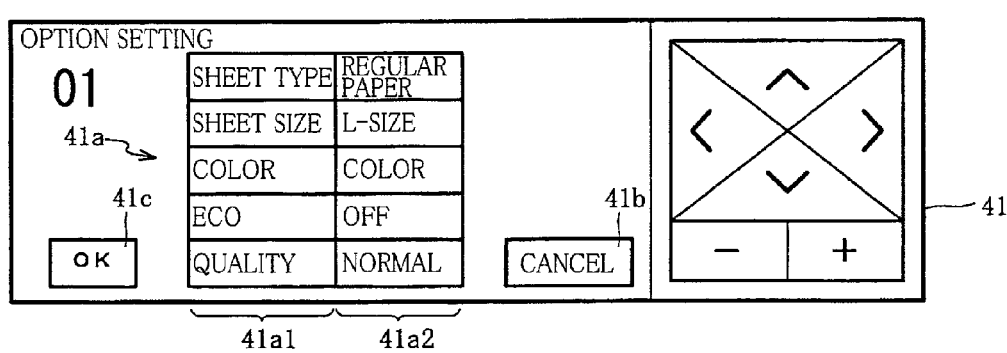
FIGS. 4A and 4B are schematic views respectively showing examples of an option setting screen and a display-order updating confirmation screen which are displayed on the LCD in a case where the registered custom is called up.
Figure 4B:
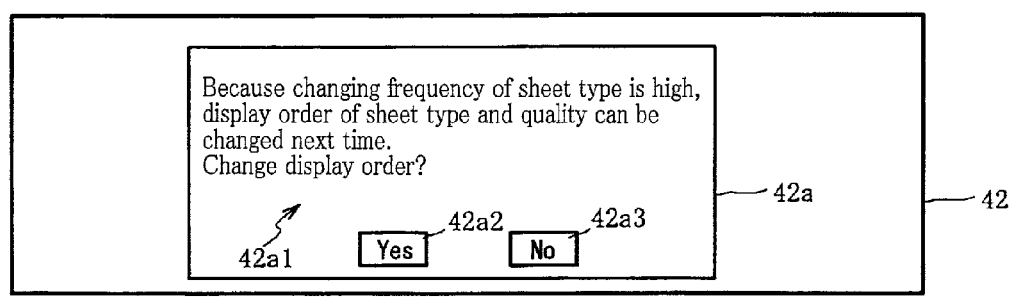

With reference to FIGS. 4A and 4B, in a case where the registered custom is called up, transition of the screen displayed on the LCD 16 will be described. The option setting screen 41 is an screen displayed on the LCD 16 in a case where the user touches one of the custom buttons 31b on the standby screen 31 in FIG. 3A corresponding to the desired custom. In FIG. 4A, there is exemplified the option setting screen 41 displayed in a case where the user touches the custom button 31b on the standby screen 31 corresponding to the custom "My Normal". The option setting screen 41 includes an option display area 41a, a cancel button for canceling a processing and returning to a previous screen, an OK button 41c for determining the setting values of the options, and so forth.

The option display area 41a consists of an option display area 41a1 for displaying the names (the setting items) of the options included in the custom called (selected) by the user, and a setting-value display area 41a2 for displaying the setting values of the respective options. The display order of the options in the option display area 41a1 is determined by the setting values of the display priority in the selected custom and the ranking values corresponding to the respective options. When the user touches one of the setting values in the setting-value display area 41a2, which the user desires to change, the touched setting value becomes in a changeable state. In a case where the user touches the OK button 41c, the setting values of the respective options are determined to be the values displayed in the option display area 41a. Then, a function execution screen (not shown) for executing a function (e.g., the copier function) corresponding to the custom whose options and setting values are displayed on the option setting screen 41 is displayed on the LCD 16.

Further, though a detailed description will be made later, the MFP 1 in the present embodiment is constructed such that a predetermined value (0.1 in the present embodiment) is added to the setting value of the display priority corresponding to the option whose setting value is changed. This addition is made when an execution button (not shown) for executing a function is touched on the function execution screen (not shown) displayed on the LCD 16 after being shifted from the option setting screen 41. However, in a case where the display order of the options is changed as a result of the addition of the predetermined value, before the addition is made, a display-order updating confirmation screen 42 is displayed on the LCD 16.

As shown in FIG. 4B, the display-order updating confirmation screen 42 is a screen for inquiring whether the user hopes to change the display order. The display-order updating confirmation screen 42 includes a window 42a. The window 42a includes a message 42a1 for inquiring whether the user changes the display order of the options, a Yes button 42a2, and a No button 42a3. In a case where the user touches the Yes button 32a2, the addition is made to the setting value of the display priority so as to change the display order of the options. On the other hand, in a case where the user touches the No button 42a3, no addition is made to the setting value of the display priority and the display order of the options is not changed. In an example shown in FIG. 4B, as the message 42a1, one option (quality) is a change target for changing the display order relative to another option (sheet type) that is an inquiry target for inquiring whether the addition is made to the setting value of the display priority, however, in a case where a plurality of options are the change targets, an inquiry may be made whether the user changes the display order between the option as the inquiry target and the plurality of the options as the change targets.

Figure 5:
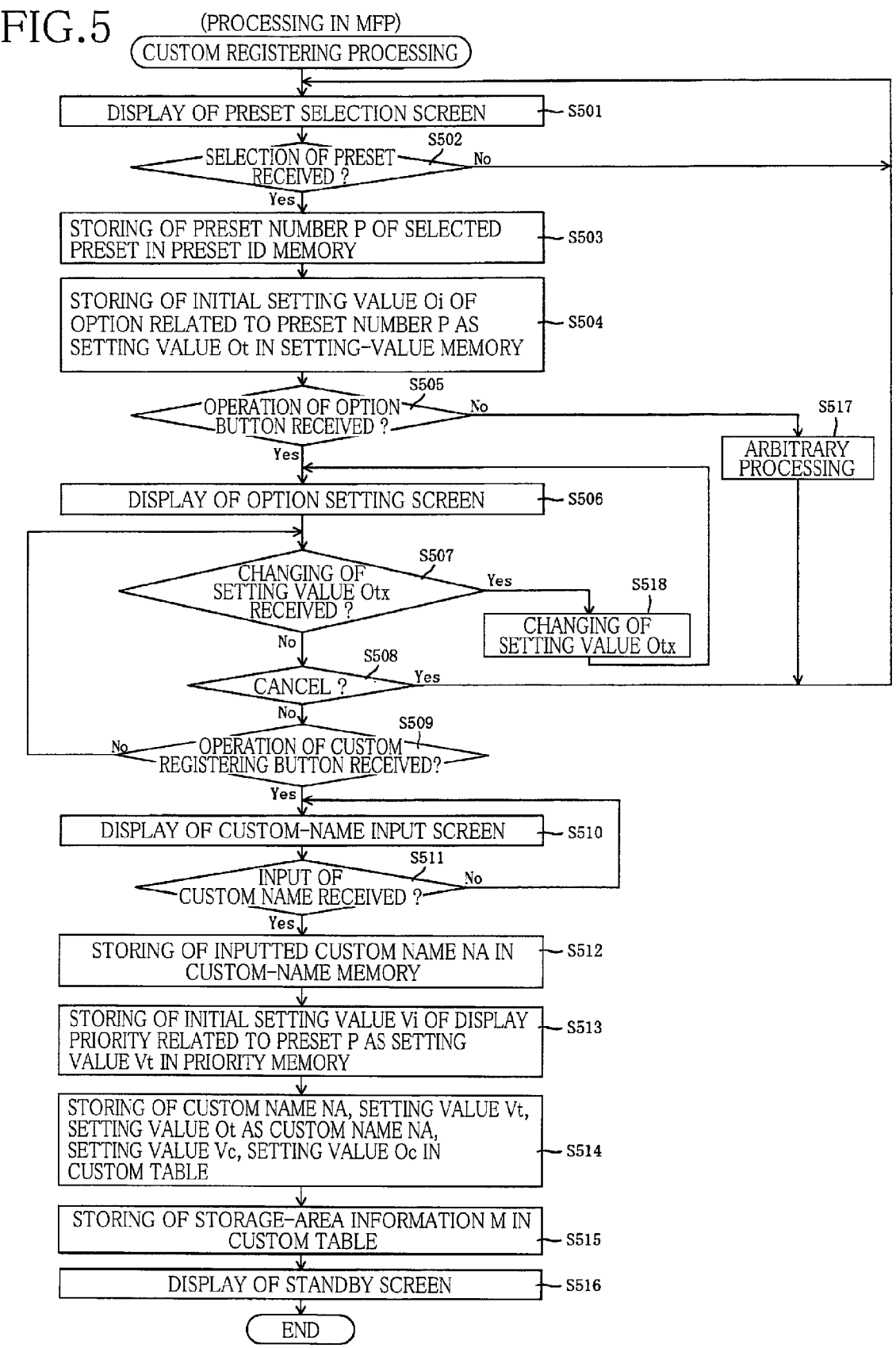
FIG. 5 is a flow chart showing a custom registering processing.

FIG. 5 is a flow chart showing a custom registering processing executed by the CPU 10 of the MFP 1 according to the control program 11*a*. The custom registering processing is a processing in which the initial setting values of the respective options stored as the preset are customized and registered as the custom. The custom registering processing starts when the preset-selection-screen display button is touched by the user on the function execution screen (not shown) displayed on the LCD 16 after being shifted from the standby screen 31.

First, in step S501 (hereinafter "step" is omitted where appropriate), the preset selection screen 32 is displayed on the LCD 16 by the CPU 10 (S501). In a case where the CPU 10 receives selecting of the preset by which one of the preset buttons 32*a* is touched (S502: YES), the CPU 10 shifts execution of the processing to S503. On the other hand, in a case where no presets are selected on the preset selection screen 32 (S502: NO), the processing returns to S501.

In S503, the CPU 10 obtains the preset number P of the selected preset from the preset table 11*b* and makes the preset ID memory 12*a* store the preset number P (S503). Then, the CPU 10 makes the setting-value memory 12*c* store the initial setting values Oi (Oi1, Oi2, . . . , OiN) of the options related to the preset numbers P as the setting values Ot (Ot1, Ot2, . . . , OtN) (S504). The value N indicates a total number of the options, and, in the present embodiment, the value N is equal to five (N=5).

Then, in a case where the CPU 10 receives touching of the option button 32*b* on the preset selection screen 32 (S505: YES), the CPU 10 shifts the processing to S506. On the other hand, in a case where the option button 32*b* is not touched on the preset selection screen 32 (S505: NO), the CPU 10 executes an arbitrary (given) processing (S517), and the processing returns to S501. In the arbitrary processing, in a case where any operation is performed except operating (touching) of the option button 32*b*, processing according to the operation is executed. On the other hand, in a case where no operation is made, no processing is performed in the arbitrary processing (S517).

In S506, the CPU 10 makes the option setting screen 33 display on the LCD 16 (S506). In S506, the CPU 10 arranges the options and the setting values thereof to be displayed on the option display area 33*a* from the top to the bottom in descending order of the ranking values Dt stored in the ranking-value memory 12*f*. Further, in S506, the CPU 10 makes the setting-value display area 33*a*2 of the option setting screen 33 display the setting values Ot (Ot1, Ot2, . . . , OtN) stored in the setting-value memory 12*c*.

In a case where the CPU 10 receives changing of the setting value Otx on the option setting screen 33 (S507: YES), the CPU 10 changes the setting value Otx stored in the setting-value memory 12*c* to the received value (S518), and makes the processing go to S506. The value x in S507 is one of the values 1, 2, . . . , N corresponding to the option whose setting value is changed.

On the other hand, in a case where, on the option setting screen 33, the setting value Otx is not changed (S507: NO), and the cancel button 33*c* is touched (S508:YES), the CPU 10 makes the processing go to S501. Further, in a case where, on the option setting screen 33, the setting value Otx is not changed (S507: NO), the cancel button 33*c* is not touched (S508: NO), and the custom registering button 33*b* is not touched (S509: NO), the CPU 10 shifts the processing to S507.

In a case where the CPU 10 receives touching of the custom registering button 33*b* (S509: YES), the CPU 10 makes the LCD 16 display a custom-name input screen (not shown) on which the user can input the custom names (S510).

In a case where the CPU 10 receives the custom name inputted by the user on the custom-name input screen (S511: YES), the CPU 10 shifts the processing to S512. On the other hand, in a case where no custom name is inputted on the custom-name input screen (S511: NO), the CPU 10 make the processing go back to S511 and hold in standby until the custom name is inputted.

In S512, the CPU 10 makes the custom-name memory 12*d* store the inputted custom name NA (S512). Then, the CPU 10 makes the priority memory 12*e* store the initial setting values Vi (Vi1, Vi2, . . . , ViN) of the display priority related to the preset number P stored in the preset ID memory 12*a* in the preset table 11*b* as the setting values Vt (Vt1, Vt2, . . . , VtN) (S513).

The CPU 10 then register the custom in the custom table 13*a* (S514). Explained in more detail, in S514, the CPU 10 makes the custom table 13*a* (the storage areas 13*a*1, 13*a*3, 13*a*4) respectively store the custom name NA stored in the custom-name memory 12*d*, the setting value Vt stored in the priority memory 12*e* and the setting value Ot stored in the setting-value memory 12*c* as the custom name NA, the setting value Vc of the display priority (Vc1, Vc2, . . . , VcN) and the setting values Oc of the option (Oc1, Oc2, . . . , OcN) (S514), and makes the storage area 13*a*2 of the custom table 13*a* store the storage area information M (S515). According to the processing in S514, S515, the custom made from the preset is registered. In the present embodiment, because of the processing in S507, S518, in which the setting values Ot stored in the setting-value memory 12*c* can be properly changed in response to the user's desire, the custom in response to the user's convenience can be registered.

Thereafter, the CPU 10 makes the LCD 16 display the standby screen 31 (S516). In S516, the CPU 10 forms the custom button 31*b* corresponding to the custom newly registered and adds the same 31*b* to the standby screen 31 to be displayed. After executing the processing in S516, the CPU 10 ends one execution of a routine of the flow chart of FIG. 5.

Figure 6:
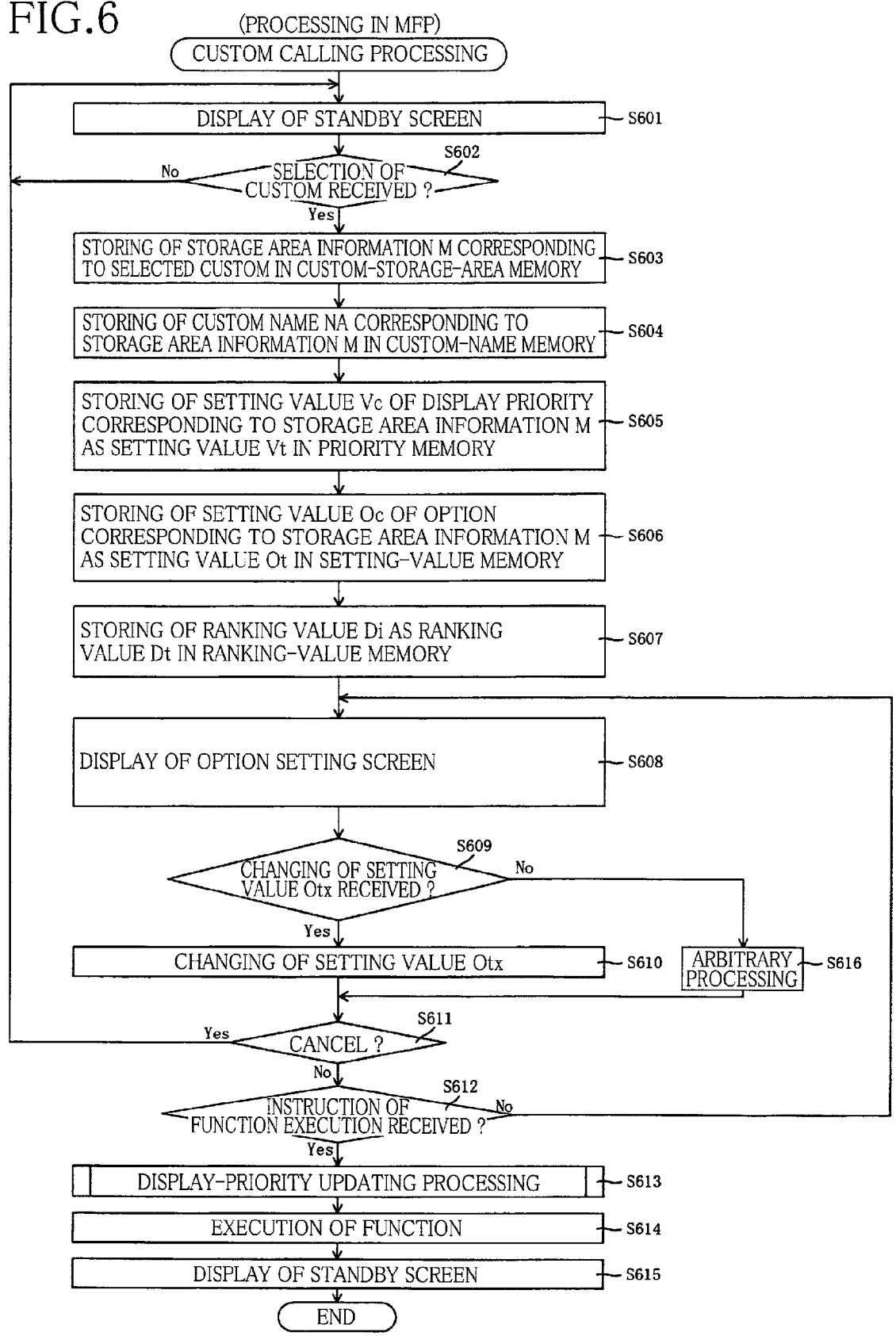
FIG. 6 is a flow chart showing a custom calling processing.

FIG. 6 is a flow chart showing a custom calling processing executed by the CPU 10 of the MFP 1 according to the control program 11*a*. The custom calling processing is a processing to call up the custom registered by the user. An execution of the custom calling processing is held in standby during the standby screen 31 is displayed on the LCD 16.

First, the CPU 10 makes the LCD 16 display the standby screen 31 (S601). In a case where the CPU 10 receives a selection of the custom by touching of one of the custom buttons 31*b* on the standby screen 31 (S602: YES), the CPU 10 makes the processing go to S603. On the other hand, in a case where no custom is selected on the standby screen 31 (S602: NO), the CPU 10 makes the processing go back to S601.

In S603, the CPU 10 acquires the storage area information M corresponding to the selected custom from the custom table 13*a* and makes the custom-storage-area memory 12*b* store the storage area information M (S603). Then, the CPU 10 makes the custom-name memory 12*d* store the custom name NA corresponding to the storage area information M in the custom table 13*a* (S604), the priority memory 12*e* store the setting values Vc (Vc1, Vc2, . . . , VcN) of the display priority corresponding to the storage area information M in the custom table 13a as the setting values Vt (Vt1, Vt2, ..., VtN), the setting-value memory 12c store the setting values Oc (Oc1, Oc2, ..., OcN) of the options corresponding to the storage area information M in the custom table 13a as the setting values Ot (Ot1, Ot2, ..., OtN) (S606). The value N is, similarly to the custom registering processing shown in FIG. 5 as described above, a total number of the options, and, in the present embodiment, the value N is equal to five (N=5).

The CPU 10 then makes the ranking-value memory 12f store the ranking values Di (Di1, Di2, ..., DiN) of the respective options stored in the option-ranking-value table 11c as the ranking values Dt (Dt1, Dt2, ..., DtN) (S607).

Then, the CPU 10 makes the LCD 16 display the option setting screen 41 (S608). In S608, the CPU 10 arranges the options and the setting values thereof to be displayed on the option display area 41a from the top to the bottom in descending order of the setting values Vt stored in the priority memory 12e. In a case where the setting values Vt of the options are the same value, the CPU 10 arranges these options and the setting values thereof from the top to the bottom in descending order of the ranking values Dt stored in the ranking-value memory 12f.

In a case where the CPU 10 receives changing of the setting value Otx on the option setting screen 41 (S609: YES), the CPU 10 changes the setting value Otx stored in the setting-value memory 12c to the received value and displays the option setting screen 41 reflected by the changed value (S610). The value x in S609 is, similarly to S509 as mentioned above, one of the values 1, 2, ..., N corresponding to the option whose setting value is changed.

On the other hand, in a case where no setting value Otx is changed on the option setting screen 41 (S609: NO), the CPU 10 executes an arbitrary processing (S616). In the arbitrary processing, in a case where any operation is performed, processing according to the operation is executed. On the other hand, in a case where no operation is made, no processing is performed in the arbitrary processing (S616).

After the processing in S610 or S616 is executed, in a case where the CPU 10 receives touching of the cancel button 41b (S611: YES), the CPU 10 returns the processing to S601. On the other hand, in a case where the cancel button 41b is not touched (S611: NO) and instruction of the function execution is not received (S612: NO), the CPU 10 makes the processing go back to S608. The instruction of the function execution is made by user's touching of an execution button (not shown) for executing a function on the function execution screen (not shown) shifted from the option setting screen 41 and displayed on the LCD 16.

On the other hand, in a case where the CPU 10 receives the instruction of the function execution (S612: YES), the CPU 10 executes the display-priority updating processing (S613). The display-priority updating processing (S613) is a processing in which the predetermined value (0.1 in the present embodiment) is added to the setting value of the display priority corresponding to the option whose setting value is changed. A detailed description of the display-priority updating processing (S613) will be made later with reference to FIG. 7.

Thereafter, the CPU 10 executes the image processing corresponding to the selected function (e.g., the copier function) according to the respective setting values stored in the setting-value memory 12c (S614). Then, the CPU 10 makes the LCD 16 display the standby screen 31 (S615), and one execution of a routine of the flow chart of FIG. 6 is ended.

FIG. 7 is a flow chart illustrating the display-priority updating processing (S613). In the display-priority updating processing (S613), the CPU 10 first sets the variable x at 1 and sets OFF to all of the flag areas 12g1 in the option flag 12g (S701). Then, the CPU 10 judges whether the setting value Otx stored in the setting-value memory 12c is different from the setting value Ocx stored in the custom table 13a (the storage area 13a3) indicated by the storage area information M stored in the custom-storage-area memory 12b (S702). In S702, in a case where the CPU 10 judges that the setting value Otx is the same as the setting value Ocx (S702: NO), the processing goes to S715.

On the other hand, in S702, in a case where the CPU 10 judges that the setting value Otx is different from the setting value Ocx (S702: YES), the processing goes to S703. In S703, the CPU 10 sets the variable y at 1 (S703). Then, in a case where the variable x is equal to the variable y (S704: YES), the CPU 10 shifts the processing to S715.

On the other hand, in S704, in a case where the variable x and the variable y are different from each other (S704: NO), the CPU 10 compares the setting value Vtx and the setting value Vty that are stored in the priority memory 12e with each other and compares the setting value Dtx and the setting value Dty that are stored in the ranking-value memory 12f with each other, and executes processing depending on the results of those comparison.

Explained in more detail, in a case where the setting value Vtx is different from the setting value Vty or where the setting value Dtx is equal to or greater than the setting value Dty (S705: NO), and in a case where a value subtracting 0.1 from the setting value Vty is different from the setting value Vtx or where the setting value Dtx is equal to or smaller than the setting value Dty (S706: NO), the CPU 10 shifts the processing to S707.

On the other hand, in a case where the setting value Vtx is equal to the setting value Vty and where the setting value Dtx is smaller than the setting value Dty (S705: YES), or in a case where the value subtracting 0.1 from the setting value Vty is equal to the setting value Vtx and where the setting value Dtx is greater than the setting value Dty (S706: YES), the CPU 10 sets ON to the flag area 12g1 corresponding to the current value y in the option flag 12g (S717) and makes the processing go to S707.

In S707, the CPU 10 adds the variable y to 1 (S707). Then, in a case where the variable y is equal to or smaller than the N (the total number of the options) (S708: NO), the CPU 10 makes the processing go back to S704. In a case where the variable y is greater than the N (S708: YES), the CPU 10 executes processing depending on a state of the flag area 12g1 in the option flag 12g. Described in more detail, in a case where the flag area 12g1 that is ON does not exist in the option flag 12g (S709: NO), the CPU 10 makes the processing go to S715.

On the other hand, in a case where the flag area 12g1 that is ON exists in the option flag 12g (S709: YES), the CPU 10 makes the LCD 16 display the display-order updating confirmation screen 42 (S710). That is, in a case where the display order of the options is changed because of adding 0.1 to the setting value Vtx, the display-order updating confirmation screen 42 is displayed on the LCD 16. In this case, the CPU 10 makes a content of the message 42a on the display-order updating confirmation screen 42 a message inquiring whether the option (the option to be changed or as the target of changing) corresponding to the value y whose flag area 12g1 is set ON and the option (the option to be inquired or as the target of inquiring) corresponding the value x currently in question are changed in the display order.

In a case where the No button 42a3 and the Yes button 42a2 in the window 42a are not touched on the display-order updating confirmation screen 42 (S711: NO, S712: NO), the CPU 10 makes the processing go back to S711.

On the other hand, in a case where the CPU 10 receives touching of the Yes button 42a2, not No button 42a3 (S711: NO, S712: YES), the CPU 10 adds the setting value Vtx to 0.1 (S713). In other words, in a case where changing of the display order of the options is confirmed by user's touching of the Yes button 42a2, 0.1 is added to the setting value Vtx. Then, the CPU 10 updates the setting value Vcx stored in the custom table 13a (the storage area 13a4) corresponding to the storage area information M stored in the custom-storage-area memory 12b by the setting value Vtx after adding (S714). In other words, the setting value Vtx after 0.1 is added is registered as the setting value Vcx of the display priority in the custom that is currently selected. Therefore, when the custom that is currently selected is called up next time, the display order of the options in the option display area 41a is changed from the current display order.

In a case where the CPU 10 receives touching of the No button 42a3 (S711: YES), the CPU 10 makes the processing go to S715. In other words, in a case where changing of the display order of the options is not confirmed by the user's touching of the No button 42a3, 0.1 is not added to the setting value Vtx. Accordingly, when the custom that is currently selected is called up next time, the display order of the options in the option display area 41a is not changed from the current display order.

In S715, the CPU 10 adds the variable x to 1 (S715). Thereafter, in a case where the variable x is equal to or smaller than the N (S716: NO), the CPU 10 makes the processing return to S702. On the other hand, in a case where the variable x is greater than the N (S716: YES), the CPU 10 ends one execution of a routine of the flow chart of FIG. 7

As described above, in the MFP 1 in the present embodiment, in a case where the initial setting values of the respective options stored as the preset are customized so as to form the custom, the initial setting values Vi of the display priority in the preset as the sources of customizing are stored as the setting values Vc of the display priority in the formed custom. Therefore, the display order of the options (the setting items) and the setting values thereof in the custom at least at the beginning of time right after registering corresponds to the feature of the preset as the source of customizing. The initial setting values Vi of the display priority included in the respective presets is previously designated (determined) as values having a relation (connection) corresponding to the features of the presets between the display positions of the options and the possibility of changing (the frequency of changing) in the setting values. Accordingly, right after the custom is registered, information about the possibility of changing in the setting values can be provided to the user by the display positions of the options. Therefore, since the user can predict which setting value of the option should be changed based on the display position of the option, the convenience in a case of changing of the setting value can be improved or enhanced.

Further, in an apparatus such as the MFP 1 using a display (the LCD 16) having a relatively small-size screen, scrolling of the screen may be necessary in order to display the options and the setting values positioned at a lower portion of the screen. However, since the initial setting values Vi of the display priority is predetermined such that the options having a high possibility of changing are positioned at an upper portion of the screen, right after the custom is registered, the options having a high possibility of changing can be positioned at the upper portion of the screen. Therefore, the possibility of scrolling of the screen when the setting value of the option is changed is decreased, the convenience in the case of changing of the setting values can be also improved or enhanced in this regard.

Furthermore, in a case where the registered custom is called up so as to change the setting value Oc of the option, 0.1 is added to the setting value Vcx of the display priority corresponding to the changed setting value Ocx such that the display priority of the option (i.e., a priority ranking of the display order in the respective options in a case of calling of the custom) is changed to a higher position. Because the display order of the options included in the custom is changed depending on the changing frequency of the setting values, the display order (positional relations) of the options can be reflected by the possibility of changing. In particular, in a case where the display order is changed by adding of 0.1 to the setting value Vcx of the display priority, the display-order updating confirmation screen 42 is displayed on the LCD 16 before adding in order to inquire the user whether changing of the display order of the options is confirmed, so that the options can be displayed based on the display order as the user desires.

In the illustrated embodiment, the MFP 1 is an example of an image processing apparatus. The LCD 16 is an example of a displaying portion. The touch panel 17 is an example of an operating portion. The preset table 11b is an example of a first storing portion. The custom table 13a is an example of a second storing portion. The CPU 10 executing S502 is an example of a first receiving portion. The CPU 10 executing S514 is an example of a storage controlling portion. The CPU 10 executing S602 is an example of a second receiving portion. The CPU 10 executing S608 is an example of a display controlling portion. The CPU 10 executing S609 is an example of a third receiving portion. The CPU 10 executing S612 is an execution receiving portion. The CPU 10 executing S702, S715, S716 is an example of a specifying portion. The CPU 10 executing S713, S714 is an example of a changing portion. The CPU 10 executing S710 is an example of a first display controlling portion. The CPU 10 executing S711, S712 is an example of a fourth receiving portion. The CPU 10 executing S506 is an example of a second display controlling portion. The CPU 10 executing S507 is an example of a fifth receiving portion. The CPU 10 executing S510 is an example of a character-row receiving portion.

The present invention is not limited to the illustrated embodiment. It is to be understood that the present invention may be embodied with various changed and modifications, without departing from the spirit and scope of the invention defined in the appended claims.

For example, though the illustrated embodiment was described as a case where the present invention is applied to the MFP 1 as the Multifunction Device, the present invention is applicable to an apparatus having at least one of functions including execution of an image processing in which image or image data are inputted or outputted, such as a scanner, a printer, a facsimile, and so on.

Further, in the illustrated embodiment, the present invention was described by exemplifying of the copier function of the MFP 1. However, the present invention is, not limited to the copier function, applicable to the functions including the execution of the image processing in which image or image data are inputted or outputted such as the printer function, the facsimile machine function, the scanner function, the media print function. That is, the present invention is applicable to a case where the presets provided for the functions, including the execution of the image processing in which image or image data are inputted or outputted, are customized and registered as the customs.

Furthermore, in the illustrated embodiment, in the custom registering processing in FIG. 5, the changing of the setting value Otx can be received on the option setting screen 33, but, instead of changing of the setting value Otx, the setting values Oi of the respective options in the preset may become the setting values of the respective options in the custom. That is, S507 and S518 may be omitted.

In the illustrated embodiment, in the custom registering processing shown in FIG. 5, in the case where the custom registering button 33 is touched, regardless of whether the setting value Otx is changed or not on the option setting screen 33, the custom-name input screen is displayed for inputting of the custom name by the user. It is preferable that, at least in a case where the setting value Otx is changed in response to the user's desire, the user can set the custom name. By such a structure that the user can set the custom name in the case where the user changes the setting value Otx, the user can easily distinguish the custom including the setting value changed in response to the user's convenience. In this structure, in a case where no setting value Otx is changed on the option setting screen 33 (i.e., the user does not change the setting value Otx) and the custom registering button 33b is touched, the preset name may be transferred as the custom name.

Moreover, though, in the illustrated embodiment, the present invention is exemplified by the case where the custom is made from the preset, the present invention is applicable to a case where contents of the registered custom are changed so as to form another custom. That is, in a case where a second custom is formed from a first custom, setting values Vc of display priority corresponding to respective options included in the first custom may become setting values of display priority corresponding to respective options in the second custom.

In the illustrated embodiment, the predetermined value is added to the setting value of the display priority corresponding to the option whose setting value is changed. A calculation in a case where the setting value is changed is not limited to an addition, as long as the display priority is changed to a higher one, may be a multiplication or the like. Instead of this, for example, in a case where it is determined that as a value of the display priority is smaller, the display priority becomes higher, a predetermined value may be subtracted in a case of changing of the setting value.

Furthermore, though the illustrated embodiment is constructed such that as the value of the display priority is greater, the display positions of the option and the setting value thereof are positioned at the upper portion on the screen, display positions are not limited to these, as long as display positions of the option and the setting value thereof are arranged according to a certain rule depending on the display priority. For example, as a value of the display priority is greater, the option may be displayed at a more left side on the screen. Alternatively, as a value of the display priority is greater, the option may be displayed at a more front side on the screen, and the option in which a value of the display priority is smaller may be displayed by switching the screen.

Further, the illustrated embodiment exemplifies a case where all of the options (the five options) are displayed within a screen of the LCD 16 as the option display area 33a in FIG. 3C and the option display area 41a in FIG. 4A, the present invention is not limited to this. In a case where all of the options are not within the screen of the LCD 16 and can not be displayed together at a time, the options to be displayed within the screen of the LCD 16 may be changed by a certain method (e.g., scrolling).

Furthermore, in the illustrated embodiment, in the display-priority updating processing (shown in FIG. 7), in the case where a YES determination in S705 (S705: YES) or a YES determination in S706 (S706: YES) is made, the CPU 10 executes S717. Alternatively, in a case where a combination of the option corresponding to the value x at present and the option corresponding to the value y at present is a combination to which the No button 42a3 has already been touched by the number of times equal to or greater than a predetermined number of times on the display-order updating confirmation screen 42, even in the case of the YES determination in S705 or the YES determination in S706, the CPU 10 may execute S707 without executing of S717. Alternatively, in the above-mentioned case, the CPU 10 may execute S707 without executing of S705 and S706.

What is claimed is:

1. An image processing apparatus configured to be allowed to execute one of an input processing and an output processing of image or image data, the image processing apparatus comprising:

a first storing portion configured to store a plurality of first setting groups each of which includes (a) settings which are respectively predetermined corresponding to a plurality of setting items regarding the image processing and (b) values of priority which are respectively predetermined corresponding to the plurality of setting items;

a processor; and a memory storing a plurality of instructions, the instructions, when executed by the processor, causing the image processing apparatus to perform;

a first receiving processing configured to cause the image processing apparatus to receive a designation of one of the plurality of first setting groups based on an operation of an operating portion;

a storage controlling processing configured to cause the image processing apparatus to store the values of priority which respectively corresponds to the plurality of setting items and the settings which respectively corresponds to the plurality of setting items, which are included in the first setting group received in the first receiving processing, as a second setting group in a second storing portion;

a second receiving processing configured to cause the image processing apparatus to receive a designation of the second setting group stored in the second storing portion based on the operation of the operating portion;

a display controlling processing configured to make a displaying portion display the settings which respectively corresponds to the plurality of setting items included in the second setting group received in the second receiving processing, based on positional relations depending on the values of priority which respectively corresponds to the plurality of setting items;

a third receiving processing configured to cause the image processing apparatus to receive a change of at least one of the settings which respectively corresponds to the plurality of setting items displayed in the displaying portion based on the operation of the operating portion; and an execution receiving processing configured to cause the image processing apparatus to receive an instruction of executing of the image processing by using the settings which respectively corresponds to the plurality of setting items displayed in the displaying portion.

2. The image processing apparatus according to claim 1, wherein the display controlling processing is configured to, in a case where the change is received in by the third receiving processing, make the display portion display the settings corresponding to the plurality of setting items included in the second setting group after the change, and
wherein the execution receiving processing is configured to cause the image processing apparatus to receive the instruction of executing of the image processing by using the settings corresponding to the plurality of setting items displayed in the displaying portion after the change.

3. The image processing apparatus according to claim 1, wherein the first storing portion is configured to store a plurality of designated information which designate each of the plurality of first setting groups,
wherein the first receiving processing is configured to cause the image processing apparatus to receive one of the plurality of designated information, and
wherein the values of priority which respectively corresponds to the plurality of setting items included in each of the first setting groups are determined for the first setting groups which are respectively designated by the plurality of designated information.

4. The image processing apparatus according to claim 1, wherein the plurality of instructions causes the image processing apparatus to further perform:
a specifying processing configured to cause the image processing apparatus to specify different setting item between the settings corresponding to the plurality of setting items included in the second setting group received in the second receiving processing and the settings corresponding to the setting items displayed in the displaying portion when, in the execution receiving processing portion, the image processing apparatus receives the instruction of executing of the image processing; and
a changing processing configured to cause the image processing apparatus to change the value of priority corresponding to the setting item specified in by the specifying processing among the values of priority stored in the second storing portion to a value whose priority is higher.

5. The image processing apparatus according to claim 4, wherein the changing processing is configured to cause the image processing apparatus to change the value of priority, caused by receiving of the instruction of executing of the image processing in the execution receiving processing.

6. The image processing apparatus according to claim 4, wherein the changing processing includes:
a first display controlling processing configured to, in a case where the value of priority is changed to be greater, when it is judged that positional relations among the plurality of setting items displayed in the displaying portion based on the values of priority are different from those before the change is made, make the displaying portion display an inquiry screen in which it is inquired whether a user makes the change; and
a fourth receiving processing configured to cause the image processing apparatus to receive an instruction whether the user makes the change in response to the inquiry based on the operation of the operating portion, and
wherein the changing processing is configured to cause the image processing apparatus to make the change in a case where, in the fourth receiving processing, the image processing apparatus receives the instruction to make the change.

7. The image processing apparatus according to claim 1, wherein the plurality of instructions causes the image processing apparatus to further perform:
a second display controlling processing configured to, when, in the first receiving processing, the image processing apparatus receives a specified one of the plurality of first setting groups, make the displaying portion display the predetermined settings corresponding to the plurality of setting items included in the first setting group designated in the first receiving processing; and
a fifth receiving processing configured to cause the image processing apparatus to receive an input of the settings corresponding to the plurality of setting items displayed in by the second display controlling processing, based on the operation of the operating portion, and
wherein the second storing portion stores, regarding the setting items in which the fifth receiving processing causes the image processing apparatus to receive the input of the settings, the settings to which the input is made and the values of priority corresponding to the plurality of setting items included in the first setting group received in the first receiving processing.

8. The image processing apparatus according to claim 7, wherein the second display controlling processing is configured to make the displaying portion display the settings corresponding to the plurality of setting items included in the first setting group designated in the first receiving processing, based on positional relations depending on the values of priority corresponding to the setting items stored in the second storing portion.

9. The image processing apparatus according to claim 7, wherein the fifth receiving processing includes a character-row receiving processing configured to cause the image processing apparatus to receive a character row consisting of at least one character, and
wherein the storage controlling processing portion is configured to, when, in the fifth receiving processing, the image processing apparatus receives the input of the settings, make the second storing portion store the character row received by the character-row receiving processing as designated information corresponding to the second setting group.

10. The image processing apparatus according to claim 1, wherein the first storing portion is configured to store the plurality of first setting groups so as to be unchanged, and
wherein the second storing portion is configured to store the second setting group so as to be changeable.

* * * * *